US009032067B2

(12) United States Patent
Prasad et al.

(10) Patent No.: US 9,032,067 B2
(45) Date of Patent: May 12, 2015

(54) DETERMINING DIFFERENCES IN AN EVENT-DRIVEN APPLICATION ACCESSED IN DIFFERENT CLIENT-TIER ENVIRONMENTS

(75) Inventors: Mukul R. Prasad, San Jose, CA (US); Ali Mesbah, Spijkenisse (NL)

(73) Assignee: Fujitsu Limited, Kawasaki-shi (JP)

( * ) Notice: Subject to any disclaimer, the term of this patent is extended or adjusted under 35 U.S.C. 154(b) by 267 days.

(21) Appl. No.: 12/723,568

(22) Filed: Mar. 12, 2010

(65) Prior Publication Data
US 2011/0225289 A1    Sep. 15, 2011

(51) Int. Cl.
G06F 15/16    (2006.01)
G06Q 30/02    (2012.01)

(52) U.S. Cl.
CPC ...................................... *G06Q 30/02* (2013.01)

(58) Field of Classification Search
USPC .......................................................... 709/224
See application file for complete search history.

(56) References Cited

U.S. PATENT DOCUMENTS

| 6,182,085 | B1 | 1/2001 | Eichstaedt et al. ............ 707/104 |
| 6,263,364 | B1 | 7/2001 | Najork et al. ................. 709/217 |
| 6,424,966 | B1 | 7/2002 | Meyerzon et al. ................. 707/3 |
| 7,496,581 | B2 | 2/2009 | Nomiyama et al. .......... 707/100 |
| 7,590,620 | B1 | 9/2009 | Pike et al. ........................... 707/3 |
| 7,634,496 | B1 | 12/2009 | Evans ........................... 707/102 |
| 7,636,717 | B1 | 12/2009 | Gupta et al. ....................... 707/6 |
| 7,761,395 | B2 | 7/2010 | Wookey ........................... 706/45 |
| 7,860,849 | B1 | 12/2010 | Venkatachary et al. ...... 707/705 |
| 2004/0103394 | A1* | 5/2004 | Manda et al. .................. 717/126 |
| 2006/0206547 | A1 | 9/2006 | Kulkarni et al. .............. 707/205 |
| 2006/0230011 | A1 | 10/2006 | Tuttle et al. ..................... 706/62 |
| 2007/0022480 | A1* | 1/2007 | Newman .......................... 726/24 |
| 2007/0061877 | A1 | 3/2007 | Sima et al. ....................... 762/12 |
| 2007/0083808 | A1* | 4/2007 | Setlur et al. ................... 715/513 |
| 2007/0168832 | A1 | 7/2007 | Richardson et al. .......... 714/758 |
| 2008/0098375 | A1 | 4/2008 | Isard .............................. 717/149 |
| 2009/0007074 | A1* | 1/2009 | Campion et al. .............. 717/124 |
| 2009/0225082 | A1 | 9/2009 | Hargrove et al. ............. 345/440 |
| 2010/0088668 | A1* | 4/2010 | Yoshihama et al. .......... 717/105 |

(Continued)

FOREIGN PATENT DOCUMENTS

CA    2 588 219    6/2006
CN    100353733 C    12/2007

(Continued)

OTHER PUBLICATIONS

U.S. Appl. No. 13/026,899, filed Feb. 14, 2011, Mukul R. Prasad.

(Continued)

*Primary Examiner* — Hamza Algibhah
(74) *Attorney, Agent, or Firm* — Baker Botts L.L.P.

(57) ABSTRACT

In one embodiment, a method includes dynamically crawling an event-driven application in a plurality of client-tier environments; for each of the client-tier environments, generating a behavioral model of the event-driven application based on the dynamic crawling; for each of the behavioral models, determining one or more pairwise equivalences with respect to one or more other ones of the behavioral models; and, for each of the client-tier environments, determining one or more differences in an end-user experience of the event-driven application in the client-tier environment with respect to one or more other end-user experiences of the event-driven application in one or more other ones of the client-tier environments.

29 Claims, 11 Drawing Sheets

(56) References Cited

U.S. PATENT DOCUMENTS

| | | | |
|---|---|---|---|
| 2010/0175049 A1 | 7/2010 | Ramsey et al. | 717/115 |
| 2011/0078556 A1 | 3/2011 | Prasad et al. | 715/234 |
| 2011/0099491 A1* | 4/2011 | Abraham et al. | 715/764 |
| 2011/0270853 A1 | 11/2011 | Curbera et al. | 707/755 |
| 2012/0109927 A1 | 5/2012 | Prasad | 707/709 |
| 2012/0109928 A1 | 5/2012 | Prasad | 707/709 |
| 2012/0109929 A1 | 5/2012 | Prasad | 707/709 |
| 2012/0109930 A1 | 5/2012 | Prasad | 707/709 |
| 2012/0109931 A1 | 5/2012 | Prasad | 707/709 |
| 2012/0110063 A1 | 5/2012 | Prasad | 707/203 |
| 2012/0210236 A1 | 8/2012 | Prasad | 715/738 |

FOREIGN PATENT DOCUMENTS

| | | |
|---|---|---|
| CN | 101344881 A | 1/2009 |
| CN | 101443751 A | 5/2009 |
| EP | 0 415 497 | 8/1990 |
| WO | WO 2005077118 A2 | 8/2005 |

OTHER PUBLICATIONS

Notification of Transmittal Letter (English), dated Jan. 30, 2014; The State Intellectual Property Office of the People's Republic of China; Chinese Office Action and Search Report and English Translation of Text of the First Office Action and Search Report, Application No. 201080039223.9, Ref. No. 073338.0815 / Ref. 09-51264CN0 / Ref. FC111US4440E; dated Jan. 17, 2014; (19 pages), Jan. 17, 2014.

United States Office Action, U.S. Appl. No. 12/957,374; pp. 14, Mar. 29, 2012.

United States Office Action, U.S. Appl. No. 12/957,376; pp. 14, Mar. 5, 2012.

United States Office Action, U.S. Appl. No. 12/957,377; pp. 39, Mar. 14, 2012.

United States Final Office Action, U.S. Appl. No. 12/957,377; pp. 38, Aug. 13, 2012.

United States of Action, U.S. Appl. No. 12/957,379; pp. 28, Sep. 13, 2012.

United States Office Action, U.S. Appl. No. 12/957,384; pp. 26, May 18, 2012.

U.S. Appl. No. 13/441,402; pp. 37, Apr. 6, 2012.

Mesbah et al.; "Invariant-Based Automatic Testing of AJAX User Interfaces"; SERG; pp. 1-11, 2009.

Roest et al.; Regression Testing Ajax Applications: Coping with Dynamism; SERG; pp. 1-10, 2009.

Halle et al.; "Eliminating Navigation Errors inWeb Applications via Model Checking and Runtime Enforcement of Navigation State Machines"; ACM; pp. 235-244, 2010.

Chau et al.; "Parallel Crawling for Online Social Networks"; ACM; pp. 1283-1284, 2007.

Hafri et al.; "Dominos: A New Web Crawler's Design"; IWAW04; pp. 8, 2004.

Mesbah et al; "Crawling AJAX by Inferring User Interface State Changes"; Software Engineering Research Group; pp. 16, 2008.

Cho et al.; "Parallel Crawlers"; ACM; pp. 13, 2002.

Mesbah, Ali et al., "Automated Cross-Browser Compatibility Testing" International Conference on Software Engineering (ICSE 2011), 2011.

Choudhary, Shauvik Roy, et al., "WebDiff: Automated Identification of Cross-browser Issues in Web Applications", International Conference on Software Maintenance (ICSM 2010), 2010.

Extended European Search Report; Application No. 11185558.1; pp. 7, Sep. 28, 2012.

Extended European Search Report; Application No. 11186160.5; pp. 7, Sep. 28, 2012.

Wolf; "High Performance Embedded Computing. Architectures, applications, and methodologies"; Referex, XP040425711; pp. 520, 2007.

Extended European Search Report; Application No. 11186926.9; pp. 8, Oct. 4, 2012.

Extended European Search Report; Application No. 11186989.7; pp. 8, Oct. 17, 2012.

Extended European Search Report; Application No. 11186993.9; pp. 7, Sep. 28, 2012.

Extended European Search Report; Application No. 12151883.1; pp. 6, Oct. 8, 2012.

Extended European Search Report; Application No. 11816805.5; pp. 8, Oct. 25, 2012.

United States Final Office Action, Application No. 12/957,379; pp. 36, Feb. 14, 2013.

Oracle; "Oracle Ultra Search User's Guide log"; pp. 272, 2003.

Ye et al.; "Crawling Online Social Graphs"; pp. 7, 2000.

United States Final Office Action, Application No. 12/957,384; pp. 33, Jan. 15, 2013.

* cited by examiner

Algorithm 500: TRACEEQUIVCHECK($G_1, G_2$)

procedure MATCH($u_1, u_2$)
  $u_1$.visited $\leftarrow$ true
  $u_2$.visited $\leftarrow$ true
  $u_1$.match $\leftarrow u_2$
  for each $e_1 \in$ OUT($u_1$)
  do
    $e_2 \leftarrow$ LOOKUP(LABEL($e_1$), OUT($u_2$))
    if ($e_2 \neq$ null)
    then
      $v_1 \leftarrow$ DEST($e_1$)
      $v_2 \leftarrow$ DEST($e_2$)
      if (($v_1$.visited = false) & ($v_2$.visited = false))
      then
        $e_1$.match $\leftarrow$ true
        $e_2$.match $\leftarrow$ true
        edgeCt += 2
        MATCH($v_1, v_2$)
      else if (($v_1$.match = $v_2$) & ($v_1$.visited = true) & ($v_2$.visited = true))
      then
        $e_1$.match $\leftarrow$ true
        $e_2$.match $\leftarrow$ true
        edgeCt += 2 main
  global edgeCt
  edgeCt $\leftarrow$ 0
  MATCH($o_1, o_2$)
  if (edgeCt = $|E_1| + |E_2|$)
    then return ($G_1 \equiv G_2$)
    else return ($G_1 \not\equiv G_2$)

*FIG. 6*

| Description | FF | IE | CH |
|---|---|---|---|
| uppercase, lowercase | style="display: | style="DISPLAY: | style="display: |
| semicolon | style="display: none;" | style="DISPLAY: none" | style="display: none;" |
| colgroup | <COL width="5%"/> | <COLGROUP><COL width="5%"/> | <COL width="5%"/> |
| middle, center | valign="middle" | valign="center" | valign="middle" |
| attribute value order | style="visibility:inherit; width:256px;" | style="WIDTH:256px; VISIBILITY:inherit;" | style="visibility:inherit; width:256px;" |
| attribute addition | <INPUT name="reason" value=""/> | <INPUT name="reason"/> | <INPUT name="reason"/> |
| element addition | <body> | <body><iframe id="yui_hist_iframe" | <body> |

FIG. 9

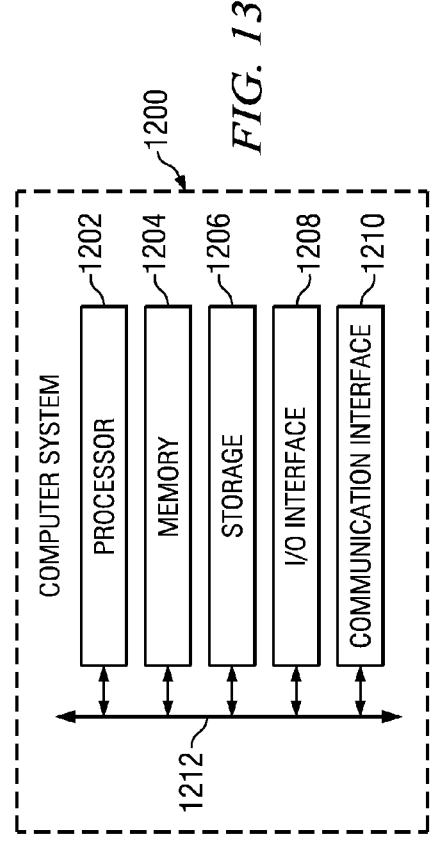

```
<ID class="ygtvtn" id="ygtvt2" onclick="javascript:togglenode ('navigationtree' ,2)
    <DIV class="ygtvspacer">
    </DIV>
   </TD>
   <LABEL class="icon-538763880" >
   </LABEL>
   <A href="javascript: void(null) ;" id="ygtvlabele12" onclick="return yahoo.widge
    my work item searches (0)
   </A>
   </TD>
  </TR>
 </TBODY>
</TABLE>
<DIV class="ygtvchildren" id="ygtvc2" style="display:none ;" >
</DIV>
```

1008

```
<ID class="ygtvtn" id="ygtvt2" onclick="javascript:togglenode ('navigationtree' ,2)
    <DIV class="ygtvspacer" >
    </DIV>
   </TD>
   <A class="icon-538763880" href="javascript: void(null) ." id="ygtvlabele12" on
    my work item searches (0)
   </A>
   </TD>
  </TR>
 </TBODY>
</TABLE>
<DIV class="ygtvchildren" id="ygtvc2" style="display: none ; >
</DIV>
<DIV class="ygtvitem" id="ygtv3">
```

*FIG. 11*

DETERMINING DIFFERENCES IN AN EVENT-DRIVEN APPLICATION ACCESSED IN DIFFERENT CLIENT-TIER ENVIRONMENTS

TECHNICAL FIELD

The present disclosure relates generally to determining differences in an event-driven application accessed in different client-tier environments.

BACKGROUND

Event-driven applications typically may be accessed in different client-tier environments. However, in many cases, a first client-tier environment may provide a different end-user experience of the event-driven application than a second client-tier environment.

BRIEF DESCRIPTION OF THE DRAWINGS

FIG. 6 illustrates an example algorithm for comparing two behavioral models at a trace-level.

FIG. 9 illustrates a table displaying example internal DOM level differences that occur when an event-driven application is accessed using different web browsers.

FIG. 11 illustrates example screen shots of detected DOM level differences of an event-driven application accessed in different client-tier environments.

FIG. 13 illustrates an example computer system.

DESCRIPTION OF EXAMPLE EMBODIMENTS

Figure 1:
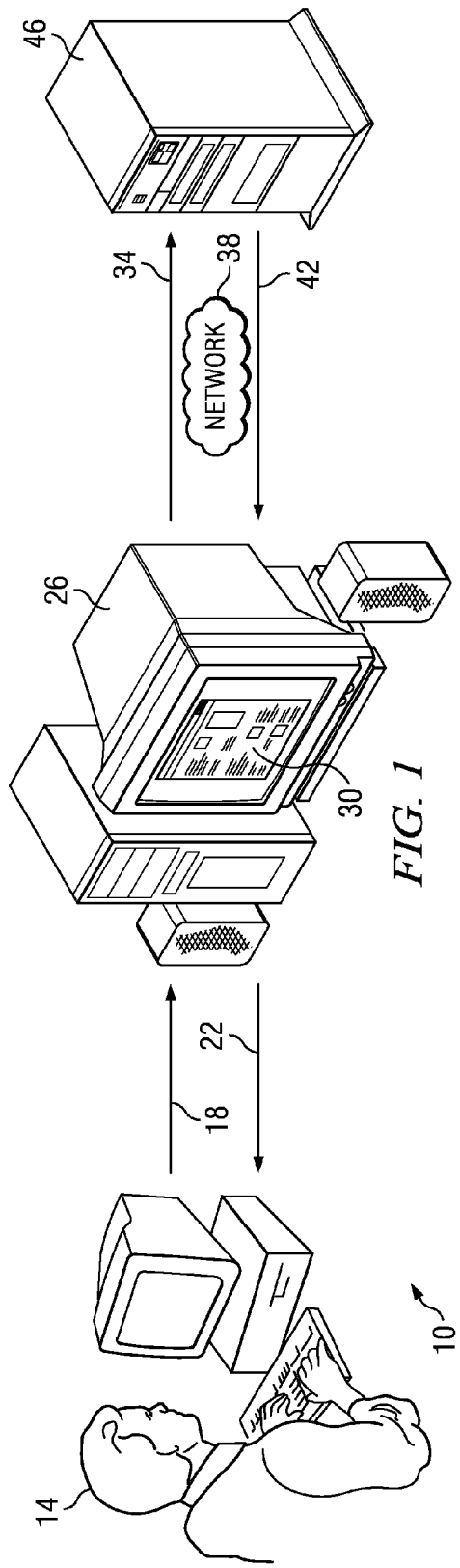
FIG. 1 illustrates an example system for accessing one or more event-driven applications.

FIG. 1 illustrates an example system 10 for accessing one or more event-driven applications 30. System 10 includes a user 14, one or more clients 26, one or more event-driven applications 30, a network 38, and one or more servers 46.

A user 14 may interact with a client 26 to access one or more event-driven applications 30. As an example and not by way of limitation, a user 14 may include a person, a program, a device, an automation, any other suitable entity, or a combination of two or more of these.

A client 26 may send and receive signals to and from one or more servers 46 in order to allow a user 14 to access one or more event-driven applications 30. As an example and not by way of limitation, a client 26 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. A client 26 may send and receive any suitable type of signals for accessing an event-driven application 30. For example and not by way of limitation, a client 26 may send and receive hypertext transfer protocol (HTTP) signals, file transfer protocol (FTP) signals, or any other suitable signals.

A client 26 may further include an I/O interface (not shown) that enables a user 14 to interact with a client 26. As an example and not by way of limitation, an I/O device may include a keyboard, keypad, microphone, monitor, mouse, printer, scanner, speaker, still camera, stylus, tablet, touchscreen, trackball, video camera, another suitable I/O device, or a combination of two or more of these. An I/O interface of a client 26 may provide a user 14 with a viewable display 22 of an event-driven application 30. As an example and not by way of limitation, an I/O device may be a monitor that provides a viewable display 22 to a user 14 by displaying an event-driven application 30 on the monitor. An I/O interface of a client 26 may further allow a user 14 to interact with an event-driven application 30 by allowing a user 14 to perform one or more events 18. An event 18 may include any suitable type of user-initiated event. As an example and not by way of limitation, an event 18 may include clicking a mouse, moving a mouse, pressing one or more keys on a keypad, touching a touchscreen, moving a trackball, speaking into a microphone, any other event that may be initiated by a user 14, or any combination of two or more of these.

A client 26 may further include one or more client-tier environments (not shown). A client-tier environment of a client 26 may allow a user 14 to access one or more event-driven applications 30. As an example and not by way of limitation, a client-tier environment may include an operating system (OS) installed on a client 26, a web browser installed on a client 26, one or more settings of a client 26 (e.g., such as the screen resolution of a monitor of a client 26), one or more variations in a web browser installed on a client 26 (e.g., the version and configuration of the web browser, including one or more web browser plug-ins and one or more web browser settings), or any combination of two or more of these.

An OS installed on a client 26 may run one or more web browsers installed on a client 26. As an example and not by way of limitation, the OS may include a Windows® 95/98/NT/XPNista/Mobile OS, an OS-X® OS, a UNIX® OS, a LINUX OS, or any other suitable OS. The web browser installed on a client 26 may allow a user 14 to access event-driven applications 30. For example and not by way of limitation, the web browser may include Microsoft Internet Explorer, Mozilla Firefox, Google® Chrome, Opera®, or any other suitable web browser. In particular embodiments, the web browser may initiate the transmittal of one or more server request signals 34 from a client 26 to one or more servers 46 over a network 38. A server request signal 34 may be based on one or more events 18 from a user 14 or web flow from an event-driven application 30. As an example and not by way of limitation, a user 14 may enter an address for an event-driven application 30 (e.g., such as a uniform resource locator (URL) or a uniform resource indicator (URI)) into an address box of the web browser, and the web browser may send a server request signal 34 to a server 46 to request content from an event-driven application 30. In particular embodiments, the server 46 may respond to the server request signal 34 by transmitting a server response signal 42 including content corresponding to an event-driven application 30 to the web browser in a client 26. After receiving the content, the web browser may render the content into a viewable form so that it may be displayed to a user 14 through the I/O interface of a client 26.

An event-driven application 30 may provide one more media objects for a user 14 to interact with. As an example and not by way of limitation, an event-driven application 30 may include a web application, a web 2.0 application, an AJAX-based web application, or any other suitable application that provides media objects. In particular embodiments, an event-driven application 30 may be run on a server 46 and interacted with by a user 14 through a browser on a client 26. For example and not by way of limitation, content for an event-driven application 30 may be sent to the web browser in a programming language, and the web browser may render the programming language viewable on a display so that a user 14 may interact with the event-driven application 30. In particular embodiments, an event driven application may include one or more contents that may be executed by the web browser.

The media objects provided by an event-driven application 30 may be changed (e.g., such as by adding, removing, or modifying the media objects) by one or more events 18 or web flow from the event-driven application 30. As an example and not by way of limitation, a user 14 may enter data using a keyboard, causing the event-driven application 30 to change the media objects provided to the user 14. In particular embodiments, when an event-driven application 30 changes the media objects, the altered media objects may be provided to a user 14 as a new a screen (or state). An event-driven application 30 may include any suitable programming language or combination of programming languages. In particular embodiments, an event-driven application 30 may include source code or object code. In particular embodiments, an event-driven application 30 may include a higher-level programming language, such as, for example, C, Perl, or a suitable extension thereof. In particular embodiments, an event-driven application 30 may include a lower-level programming language, such as assembly language (or machine code). In particular embodiments, an event-driven application 30 may include JAVA. In particular embodiments, an event-driven application 30 may include Hyper Text Markup Language (HTML), Extensible Markup Language (XML), Javascript (JS), Java Server Pages (JSP), Hypertext Preprocessor (PHP), or other suitable markup language.

A network 38 connects one or more clients 26 to one or more servers 46, transporting one or more signals to and from the one or more clients 26 and the one or more servers 46. A network 38 may refer to any interconnecting system capable of transmitting audio, video, signals, data, messages, or any combination of the preceding. A network 38 may comprise all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding. A network 38 may transport any suitable signal for accessing an event-driven application 30 on one or more servers 46. For example and not by way of limitation, a network 38 may transport HTTP signals, FTP signals, or any other suitable signals.

A server 46 may store one or more event-driven applications 30, and may further send and receive signals to and from one or more clients 26 in order to allow a user 14 to access one or more event-driven applications 30 stored in the server 46. As example and not by way of limitation, a server 46 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. In particular embodiments, a server 46 may receive one or more server request signals 34 from a web browser installed on a client 26. In particular embodiments, a server 46 may respond to a server request signal 34 by transmitting a server response signal 42 that includes content corresponding to an event-driven application 30 to a web browser in a client 26. A server 46 may send and receive any suitable signals in order to allow a client 26 to access an event-driven application 30. For example and not by way of limitation, a server 46 may send and receive HTTP signals, FTP signals, or any other suitable signals.

In particular embodiments, an event-driven application 30 may be accessed in different client-tier environments. As example and not by way of limitation, an event driven application 30 may be accessed in a first client-tier environment that includes a Microsoft® Internet Explorer web browser, and the same event-driven application 30 may also be accessed in a second client-tier environment that includes a Mozilla® Firefox web browser. In particular embodiments, although the event-driven application 30 may be accessed in both client-tier environments, an end-user experience of the event-driven application 30 may be different on each client-tier environment. In particular embodiments, such differences may be caused by an OS installed on a client 26, a browser installed on a client 26, any other numerous differences in the client-tier environments, or any combination of two or more of these.

Unfortunately, these different end-user experiences may cause problems because an event-driven application 30 may modify the content provided based on one or more events 18 that occur. As an example and not by way of limitation, an event-driven application 30 may modify its content based on a user scrolling over certain content in the event-driven application 30. However, if the content is displayed differently in certain client-tier environments (or not displayed at all) an event 18 may never occur, and the content may not be modified—causing further differences in the end-user experience As such, even minor differences in an end-user experience may turn into much bigger differences.

Figure 2:
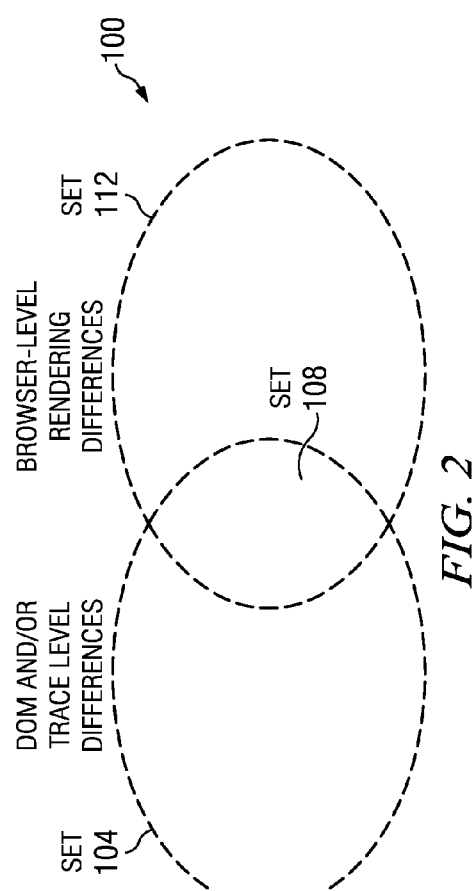
FIG. 2 illustrates an example Venn diagram depicting various types of differences that may occur in an event-driven application that is accessed in different client-tier environments.

FIG. 2 illustrates an example Venn diagram depicting various types of differences that may occur in an event-driven application that is accessed in different client-tier environments. A set 104 may include one or more differences in the Document Object Model (DOM) representations of one or more screens of an event-driven application, one or more differences in a client-side state (e.g., such as in the set or specific values of Javascript® variables on a client), and one or more differences in a set of possible traces (e.g., alternating sequences of screens and events causing the screen transitions) on a client-side. A set 112 may include one or more differences that may be observed by a human user on a web browser. A set 108 may include one or more differences that fall into both set 104 and set 112. In particular embodiments, one or more differences that are included in a set 104, a set 108, a set 112, or any combination of two of these may be determined, as is discussed in FIGS. 3-12.

Figure 3:
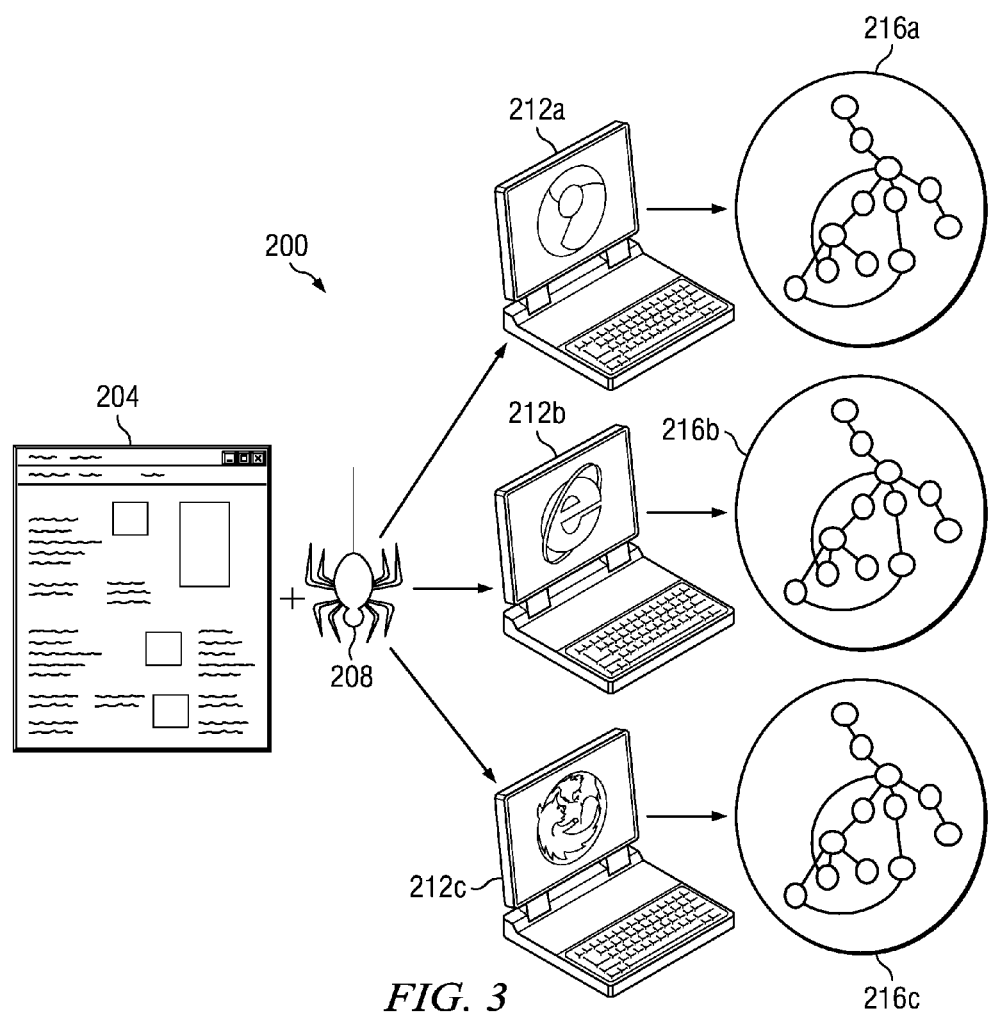
FIG. 3 illustrates an example system for generating one or more behavioral models of an event-driven application.

FIG. 3 illustrates an example system 200 for generating one or more behavioral models 216 of an event-driven application 204. In particular embodiments, a behavioral model 216 may be generated for an event-driven application 204 in a plurality of client-tier environments 212 using one or more crawlers 208. As such, the behavioral models 216 may be generated automatically and dynamically.

An event-driven application 204 of FIG. 3 may be similar to an event-driven application 30 of FIG. 1. As such, an event-driven application 204 may provide one more media objects for a user to interact with.

A crawler 208 may dynamically crawl an event-driven application 204. In particular embodiments, the dynamic crawl of a crawler may allow a crawler 208 to dynamically analyze an event-driven application 204 in order to generate a behavioral model 216. As example and not by way of limitation, a crawler 208 may include Crawljax, WebCrawler, Methabot, Googlebot, or any other suitable crawler. In particular embodiments, a crawler 208 may exercise code on a client (e.g., such as client 26 of FIG. 1) in order to detect and execute one or more doorways (e.g., clickables) of an event-driven application 204. As such, in particular embodiments, a crawler 208 may dynamically analyze one or more screens of an event-driven application 204 that are rendered by the web browser on a client. Furthermore, a crawler 208 may analyze how the one or more executed doorways effect the one or more rendered screens of an event driven application 204. In particular embodiments, this may involve replicating (or firing) one or more events, such as events 18 of FIG. 1 (e.g., clicking on a mouse, typing on a keyboard), in order to analyze how such events effect the dynamic DOM tree in a browser before and after the event is replicated. In particular embodiments, by analyzing and storing the effects that occur before and after each of the replicated events, a crawler 208 may incrementally build a behavioral model 216 for an event-driven application 204.

A client-tier environment 212 may allow one or more event-driven applications 204 to be accessed at a client. In particular embodiments, a client-tier environment may be similar to a client-tier environment of FIG. 1. As an example and not by way of limitation, a client-tier environment 212 may include an operating system (OS) installed on a client, a web browser installed on a client, one or more settings of a client (e.g., such as the screen resolution of a monitor of a client), one or more variations in the web browser installed on a client (e.g., the version and configuration of the web browser, including one or more web browser plug-ins and one or more web browser settings), or any combination of two or more of these.

According to the illustrated embodiment, system 200 includes three client-tier environments 212. In particular embodiments, each of the client-tier environments 212 may be different. For example and not by way of limitation, a client-tier environment 212*a* may include a Windows® Vista OS and a Google® Chrome web browser; a client-tier environment 212*b* may include a Windows® XP OS, a Microsoft® Internet Explorer web browser, and a particular screen resolution; and a client-tier environment 212*c* may include a UNIX® OS, a Mozilla® Firefox web browser, and one or more plug-ins for the web browser. Although system 200 illustrates three client-tier environments 212, system 200 may include more than three client-tier environments 212 or less than three client-tier environments 212. As an example and not by way of limitation, system 200 may include two or more client-tier environments 212.

According to the illustrated embodiment, a crawler 208 may dynamically crawl an event-driven application 204 in each of the client-tier environments 212 in order to analyze the event-driven application 204. Accordingly, a crawler 208 may generate a behavioral model 216 for each client-tier environment 212. In particular embodiments, the crawling conducted by a crawler 208 may be performed in an identical fashion for each client-tier environment 212. As an example and not by way of limitation, a crawler 208 may replicate the same events (and do so in the same order) while crawling the event-driven application 204 on each client-tier environment 212. As such, the only differences in the behavioral models 216 (if there are any at all) may be caused by the different client-tier environments 212. In particular embodiments, the crawling conducted by a crawler 208 may be automatic. As an example and not by way of limitation, a crawler 208 may be initiated for a particular event-driven application 204 in a particular client-tier environment 212, and the crawler 208 may perform the entire crawl (including the analysis and behavioral model 216 generation) for that particular event-driven application 204 in the particular client-tier environment 212 without any further prompting.

A behavioral model 216 may be generated based on the analysis conducted by a crawler 208 on an event-driven application 204. According to the illustrated embodiment, system 200 includes three behavioral models 216—one behavioral model 216 for each client-tier environment 212. Behavioral models 216 are further described in FIG. 4.

Figure 4:
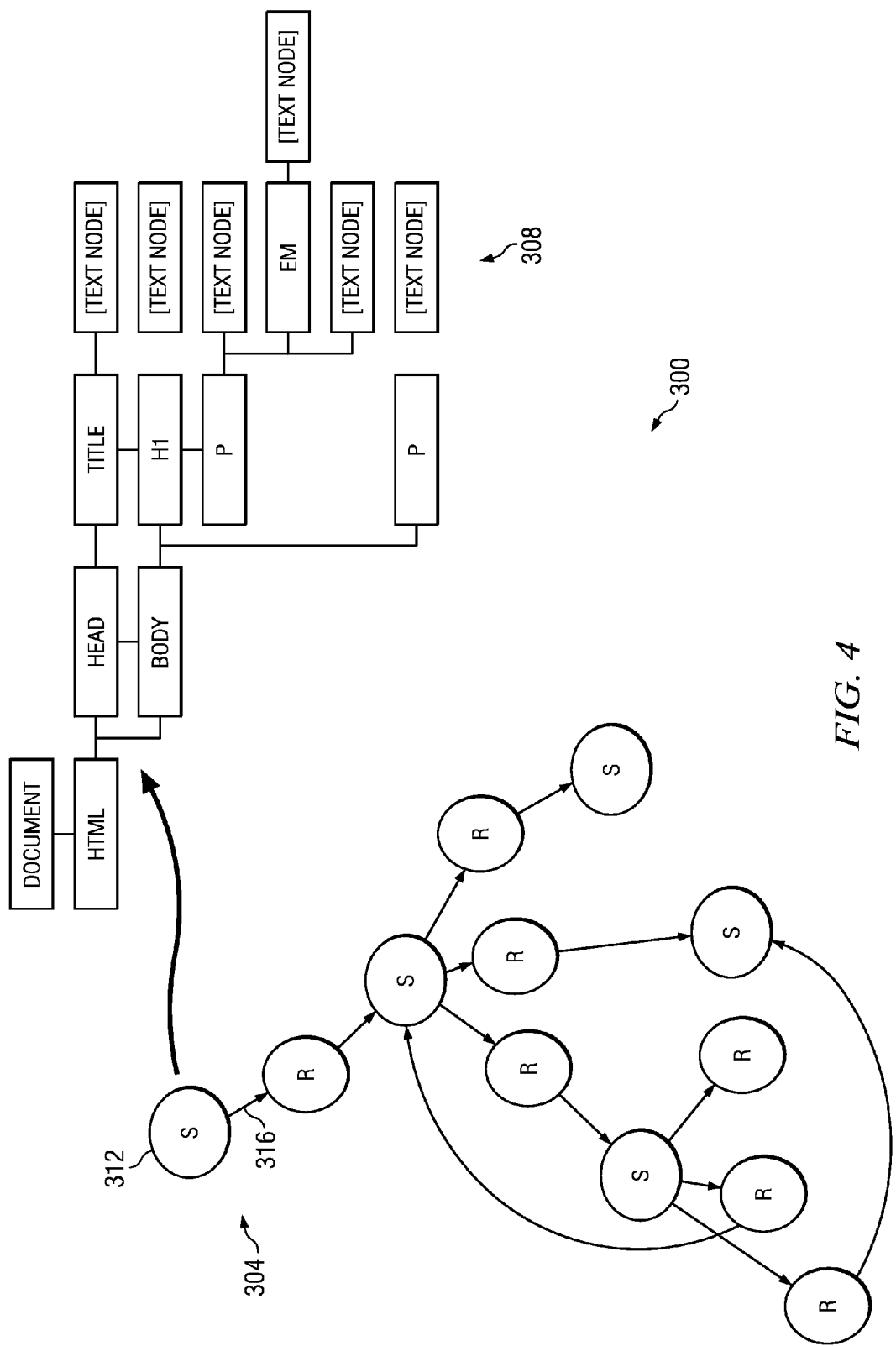
FIG. 4 illustrates an example behavioral model generated by dynamically crawling an event-driven application in a client-tier environment.

FIG. 4 illustrates an example behavioral model 300 generated by dynamically crawling an event-driven application in a client-tier environment. A behavioral model 300 of FIG. 4 may be similar to a behavioral model 216 of FIG. 3.

In particular embodiments, a behavioral model 300 may be generated by dynamically crawling an event-driven application in a client-tier environment, as is discussed in FIG. 3. For example, a behavioral model 300 may be generated by a crawler, such as a crawler 208 of FIG. 3.

In particular embodiments, a behavioral model 300 may be a finite state machine (FSM) with partial transition functions. As an example and not by way of limitation, a behavioral model 300 may include each of the states of the event-driven application, and each of the transitions that caused each of the states. In particular embodiments, a state of a behavioral model 300 may refer to a screen observed by a user when the event-driven application is accessed in a particular client-tier environment. In particular embodiments, a transition may refer to an event (e.g., clicking a mouse, moving a mouse, pressing one or more keys on a keypad) that caused the observed screen (or state) to change. A behavioral model 300 may include a state graph 304 and a set of one more screen models 308 for one more states of the state graph 304.

A state graph 304 may include a graphical representation of the finite-state machine with the states represented as unnamed vertices. In particular embodiments, a state graph 304 captures the set of traces (e.g., alternating sequences of events and screen transitions caused by the events) without reference to the details of each state. In particular embodiments, a state graph 304 may be a labeled, directed graph, with a special designed start vertex. It may be denoted by a 5-tuple, $G(V, E, o, \Sigma, L)$, where V is the set of vertices, E is the set of (directed) edges, o is the special designated start vertex, E is an alphabet of labels, and L: $E \rightarrow \Sigma$ is a labeling function that assigns a label from E to each edge. According to the illustrated embodiment, each node 312 in a state graph 304 of a behavioral model 300 may represent a state of a screen of the event-driven application. Furthermore, each edge 316 in a state graph 304 of a behavioral model 300 may represent an event (e.g., such as a user-initiated interaction with an event-driven application) causing a transition from one of the screens to another. In particular embodiments, each edge 316 of a state graph 304 of a behavioral model 300 may be labeled (not shown) with the event that caused the transition between states.

A screen model 308 may include a programmatic representation of each state (screen). In particular embodiments, a screen model 308 captures details of each screen without any knowledge of transitions leading up to or out of the screen. In particular embodiments, a screen model 308 may be a rooted, directed, labeled tree. It may be denoted by a 5-tuple, T(Q, D, r, Λ, δ), where Q is the set of vertices, D is the set of directed edges, r ∈ Q is the root vertex, Λ is a finite set of labels and δ: Q→Λ is a labeling function that assigns a label from Λ to each vertex in Q. In particular embodiments, a screen model 308 may be an abstracted version of the DOM tree of a given state (screen) displayed on a web browser. Although behavioral model 300 illustrates a single screen model 308, a behavioral model 300 may include any suitable number of screen models 308. As an example and not by way of limitation, a behavioral model 300 may include a screen model 308 for every state (screen) of a state graph 304 of a behavioral model 300.

Figure 5:
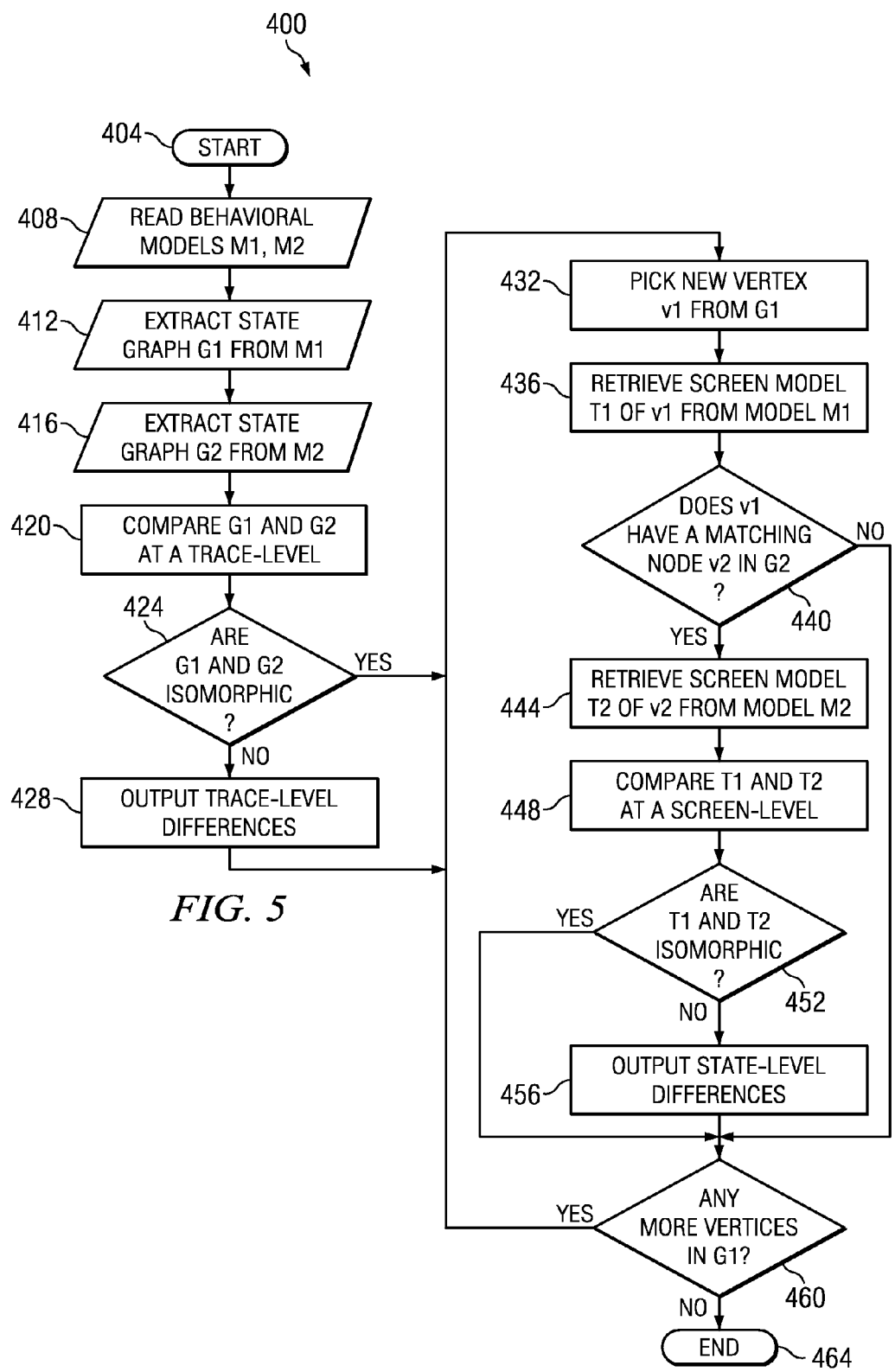
FIG. 5 illustrates an example method for determining one or more differences between two behavioral models of an event-driven application.

FIG. 5 illustrates an example method 400 for determining one or more differences between two behavioral models of an event-driven application. In particular embodiments, by determining one or more differences between two behavioral models of an event-driven application, one or more differences in an end-user experience of the event-driven application in a client-tier environment may be determined with respect to one or more other end-user experiences of the event-driven application in one or more other ones of the client-tier environments. In particular embodiments, method 400 may further include determining one or more pairwise equivalences for each of the behavioral models with respect to one or more other ones of the behavioral models.

The method begins at step 404. At step 408, a first behavioral model (behavioral model M1) and a second behavioral model (behavioral model G2) are read. At step 412, a first state graph (state graph G1) is extracted from behavioral model G1. At step 416, a second state graph (state graph G2) is extracted from behavioral model G2. At step 420, state graph G1 and state graph G2 are compared at a trace-level. A trace-level comparison may determine one or more pairwise equivalences between state graphs G1 and G2. In particular embodiments, determining one or more pairwise equivalences between state graphs G1 and G2 may include determining whether any edges (e.g., events that cause a transition between states or screens) of state graph G1 are isomorphic with any edges of state graph G2; and whether any nodes (e.g., representing states or screens) of state graph G1 are isomorphic with any nodes of state graph G2. In particular embodiments, the comparison may start from the root node of each state graph and traverse through a depth-first search. In particular embodiments, determining whether any edges are isomophoric may include retrieving the DOM element and the event from each corresponding node, and attempting to reconcile them.

In particular embodiments, the edges may be considered isomorphic if the edit distance between the two edges is lower than a similarity threshold. In particular embodiments, the edit distance may be based on event types, tag names, attributes and their values, Xpath positions of the two edges on their corresponding DOM trees, ID attributes, or any combination of two or more of these. In particular embodiments, the nodes may be considered isomorphic if and only if each of the previous nodes, successive nodes, and edges are isomorphic. In particular embodiments, the trace-level comparison may also determine which states of behavioral model M1 may be considered to be matching particular states of behavioral model M2.

At step 424, if any edges or nodes of state graphs G1 and G2 were determined to not be isomorphic, the trace-level differences of the state graphs G1 and G2 are outputted at step 428. In particular embodiments, the output may include a list of all the edges and the nodes that were determined to not be isomorphic. However, at step 420, if all of the edges and nodes of state graphs G1 and G2 were determined to be isomorphic, no trace-level differences may be outputted, and the method moves to step 432.

At step 432, a vertex (vertex v1) is picked from state graph G1. At step 436, a screen model (screen model T1) corresponding to the state (or screen) represented by vertex v1 is retrieved from the behavioral model M1. At step 440, it is determined if the trace-level comparison between state graphs G1 and G2 (step 416) produced a matching node v2 in state graph G2 corresponding to vertex v1 in state graph G1. If not, the algorithm moves to step 460. Otherwise, at step 444, a screen model (screen model T2) corresponding to the state (or screen) represented by vertex v2 is retrieved from the behavioral model M2. In particular embodiments, vertex v1 and vertex v2 may be determined as matching during the trace-level comparison discussed above in step 416. At step 448, screen model T1 and screen model T2 are compared at a screen-level. A screen-level comparison may determine one or pairwise equivalences between the behavioral models M1 and M2. In particular embodiments, determining one or more pairwise equivalences between the behavioral models M1 and M2 may include determining whether screen model T1 and screen model T2 are isomorphic. In particular embodiments, the screen-level comparison may include retrieving the DOM tree and Javascript® state variables for both screen model T1 and screen model T2, and attempting to reconcile them. In particular embodiments, screen model T1 and screen model T2 may be determined to be isomorphic by checking the equivalence between the DOM trees corresponding to screen model T1 and screen model T2 and matching the name-value pairs of Javascript® variables of screen model T1 and screen model T2.

At step 452, if screen model T1 and screen model T2 were determined to not be isomorphic, the screen-level differences for the screen model T1 and the screen model T2 are outputted at step 456. In particular embodiments, outputting the screen-level differences may include determining whether the differences may be irrelevant. In particular embodiments, an irrelevant difference may not be outputted. In particular embodiments, an irrelevant difference may result from certain web browsers rendering DOM changes differently than other web browsers. As an example and not by way of limitation, certain stylistic differences between various web browsers (e.g., case sensitivity, white space, attribute order, and node text values) may be determined to be an irrelevant difference, and may not be outputted. After the state-level differences are outputted, the method moves to step 460.

Furthermore, if, at step 452, screen model T1 and screen model T2 were determined to be isomorphic, the method also moves to step 460. At step 460, a determination may be made regarding whether there are any more vertices in state graph G1 (or in state graph G2). If there are additional vertices, steps 432 through 460 are repeated for each additional vertex in state graph G1 (or in state graph G2). If there are no additional vertices, the method ends at step 464.

In particular embodiments, the method 400 may be repeated for each pairing of behavioral models. As an example and not by way of limitation, if three behavioral models are generated by a crawler for an event-driven application in three different client-tier environments, the method 400 may be repeated for each pairing of the three behavioral models. As such, each trace-level difference (or incompatibility) and each screen-level difference between each of the behavioral models may be determined and outputted. Furthermore, for each of the behavioral models, one or more pairwise equivalences with respect to one or more other ones of the behavioral models may be determined. In particular embodiments, the outputting of the trace-level differences and the screen-level differences may include sorting, classifying, and/or filtering the differences before outputting them.

FIG. 6 illustrates an example algorithm 500 for comparing two behavioral models at a trace-level. In particular embodiments, algorithm 500 may be used to determine whether any edges and any nodes of a first behavioral model are isomorphic with any edges and any nodes of a second behavioral model. In particular embodiments, algorithm 500 may be used in FIG. 5.

In particular embodiments, algorithm 500 implements a trace-level equivalence check on the state graph ($G_1$) of the first behavioral model and the state graph ($G_2$) of the second behavioral model as an isomorphism check. The function OUT(v) returns the set of outgoing edges of vertex v, LABEL (e) returns the label of edge e and the function LOOKUP (l, edgeSet) returns an edge having the label 1 from the set of edges edgeSet or null if none exists. DEST(e) returns the destination vertex of edge e. It may be assumed that the match field of each edge visited field of each vertex (in both $G_1$ and $G_2$) is initialized to false and the match field of each vertex in $G_1$ is initialized to null. In particular embodiments, algorithm 500 is a simple variant of depth-first search and linear-time in the sizes of $G_1$, $G_2$ (e.g., $O(|V_1|+|V_2|+|E_1|+|E_2|)$).

In particular embodiments, $G_1(V_1,E_1,o_1,\Sigma,L_1)$, and $G_2(V_2,E_2,o_2,\Sigma,L_2)$ may be trace-equivalent if and only there exists a bijective mapping function M: V, $V_1 \rightarrow V_2$ such that the following are true:

$$\forall u,v \in V_1.(u,v) \in E \Leftrightarrow (\mathcal{M}(u),\mathcal{M}(v)) \in V_2 \quad (1)$$

$$\forall e_1(u_1,v_1) \in E_1, e_2(u_2,v_2) \in E_2 \text{ such that } \mathcal{M}(u_1)=u_2 \text{ and } \mathcal{M}(v_1)=v_2 \Rightarrow \mathcal{L}_1(e_1)=\mathcal{L}_2(e_1) \quad (2)$$

$$\mathcal{M}(o_1)=o_2 \quad (3)$$

In particular embodiments, algorithm 500 may determine that $G_1$ and $G_2$ are equivalent if and only if they satisfy equations (1), (2), and (3), above.

In the case where algorithm 500 determines that $G_1$ is not equivalent to $G_2$, the algorithm 500 may determine that one or more sub-graphs implied by the partial match produced by the algorithm (e.g., the sub-graph implied by all nodes and edges that were matched to a counter-part in the other graph) are trace-equivalent based on equations (1), (2), and (3). For example and not by way of limitation, the subgraph: $G'_1(V'_1,E'_1,o_1,\Sigma,L'_2)$ of $G_1$, where $E'_1=\{e \in E_1: e.\text{match}=\text{true}\}$, $V'_1=\{v \in V_1: v.\text{match} \neq \text{null}\}$, $L'_1: E'_1 \rightarrow E$ and $L'_1(e)=L_1(e) \forall e \in E'_1$. (and a similarly defined sub-graph for $G'_2$ of $G_2(V'_2,E'_2,o_2,\Sigma,L'_2)$) may be determined to be trace-equivalent per equations (1), (2), and (3).

Further, in the case where $G_1$ is not equivalent to $G_2$, algorithm 500 not only produces a trace equivalent partial match but actually a maximal partial match (e.g., there do not exist a pair of edges $e_1$ and $e_2$, where $e_1 \in E_1$ but $e_1 \in E'_1$ and $e_2 \in E_2$ but $e_2 \in E'_2$ which can be added to $G'_1$ and $G'_2$ respectively), along with their source and sink nodes such that the resulting graphs may also be trace-equivalent.

In particular embodiments, although algorithm 500 computes maximal matches, the match need not be the maximum match possible. In particular embodiments, a variant of algorithm 500 may back-track on matching decisions made in order to compute the absolute maximum match.

Figures 7, 8:
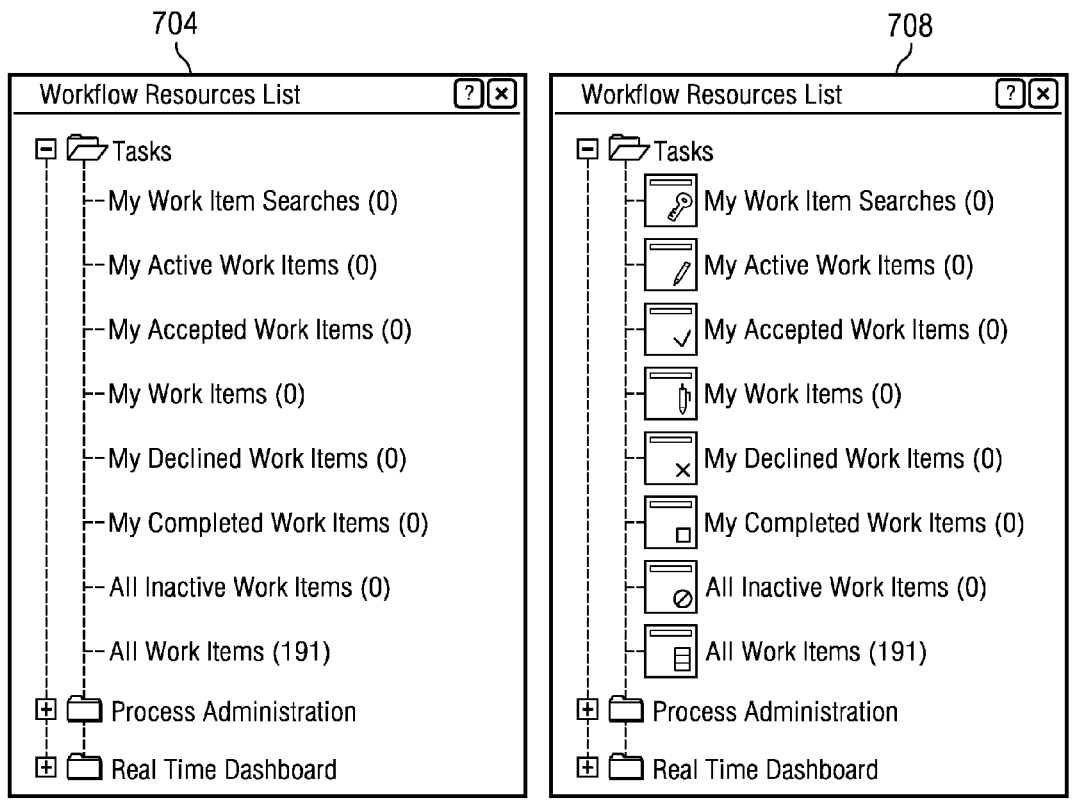
FIG. 7 illustrates an example algorithm for comparing two behavioral models, and outputting the differences between the two behavioral models.
FIG. 8 illustrates example end-user experiences of an event-driven application accessed in different client-tier environments.

FIG. 7 illustrates an example algorithm 600 for comparing two behavioral models, and outputting the differences between the two behavioral models. In particular embodiments, algorithm 600 may be used in FIG. 5.

The function STATEGRAPH returns the underlying state graph for comparison through the Trace Equivalence Check (shown in FIG. 6). traceMatch is an object that receives the result of algorithm 500 of FIG. 6, including the partial match, in case where $G_1$ is not equivalent to $G_2$. OUTPUTTRACEDIFF extracts and presents the user with the trace-level differences. Similarly, at the screen-level, the function GETSCREEN extracts and returns the detailed screen representation of a vertex v of a state graph from its corresponding behavioral model, to be used for the equivalence check by algorithm 600. scrnMatch is the object receiving the result of this comparison and the function OUTSCRDIFF extract and presents these screen-level differences to the user.

In particular embodiments, since the screen model is represented as a rooted, directed, labeled tree, a screen model $T_1$ of a first behavioral model and a screen model $T_2$ of a second behavioral model may be compared based on the isomorphism of the respective trees. Thus, in particular embodiments, screen models $T_1(Q_1, D_1, r_1, \Lambda, \delta_1)$ and $T_2(Q_2, D_2, r_2, \Lambda, \delta_2)$ may be determined to be equivalent, (e.g., $T_1 \equiv T_2$) if and only if there exists a bijective mapping function N: $Q_1 \rightarrow Q_2$ such that:

$$\mathcal{N}(r_1)=r_2 \quad (4)$$

$$\forall q \in Q_1, \delta_1(q)=\delta_2(\mathcal{N}(q)) \quad (5)$$

$$\forall u,v \in Q_1, (u,v) \in D_1 \Leftrightarrow (\mathcal{N}(u), \mathcal{N}(v)) \in D_2 \quad (6)$$

Since screen models are rooted, labeled trees, screen matching (the function call SCRNEQUIVCHECK $(T_1, T_2)$ in algorithm 600) may be performed in linear time by a simple variant of the tree isomorphism algorithm. In particular embodiments, if two screens are determined to not be matching, algorithm 600 may utilize snapshots of the screens in outputting the differences to a user. As an example and not by way of limitation, during the dynamic crawling of an event-driven application, a snapshot may be made of each screen change in the web browser. In particular embodiments, when a screen mismatch is found by algorithm 600, the snapshots corresponding to each of the mismatched screens may be used to create a visualization report that is outputted to a user. In particular embodiments, the visualization report may include the transition paths that lead to the mismatched screens, and may also include the DOM trees corresponding to the mismatched screens. In particular embodiments, the differences between the screens may be highlighted in the DOM trees provided to the user.

FIG. 8 illustrates example end-user experiences of an event-driven application accessed in different client-tier environments. According to the illustrated embodiment, screenshot 704 provides a different end-user experience of a particular event-driven application than screenshot 708. In particular embodiments, the different end-user experiences may be caused by the different client-tier environments. As an example and not by way of limitation, screenshot 704 may include a screen of an event-driven application displayed to a user using a Google® Chrome web browser, and screenshot 708 may include a screen of the event-driven application displayed to a user using a Mozilla® Firefox web browser.

FIG. 9 illustrates a table 800 displaying example internal DOM level differences that occur when an event-driven application is accessed using different web browsers. According to the illustrated embodiment, row 804 includes a list of internal DOM level differences (e.g., elements, attributes, and their values and order of appearance) that may occur when an event-driven application is accessed using a Mozilla® Firefox web browser. Row 808 includes a list of internal DOM level differences that may occur when an event-driven application is accessed using a Microsoft® Internet Explorer web browser. Row 812 includes a list of internal DOM level differences that may occur when an event-driven application is accessed using a Google® Chrome web browser. In particular embodiments, one or more of these internal DOM level differences may be determined to be irrelevant differences. As such, one or more of these differences may not be outputted to a user. In particular embodiments, one or more of these DOM level differences may be determined to be relevant differences. As such, one or more of these differences may be outputted to a user.

Figure 10A:
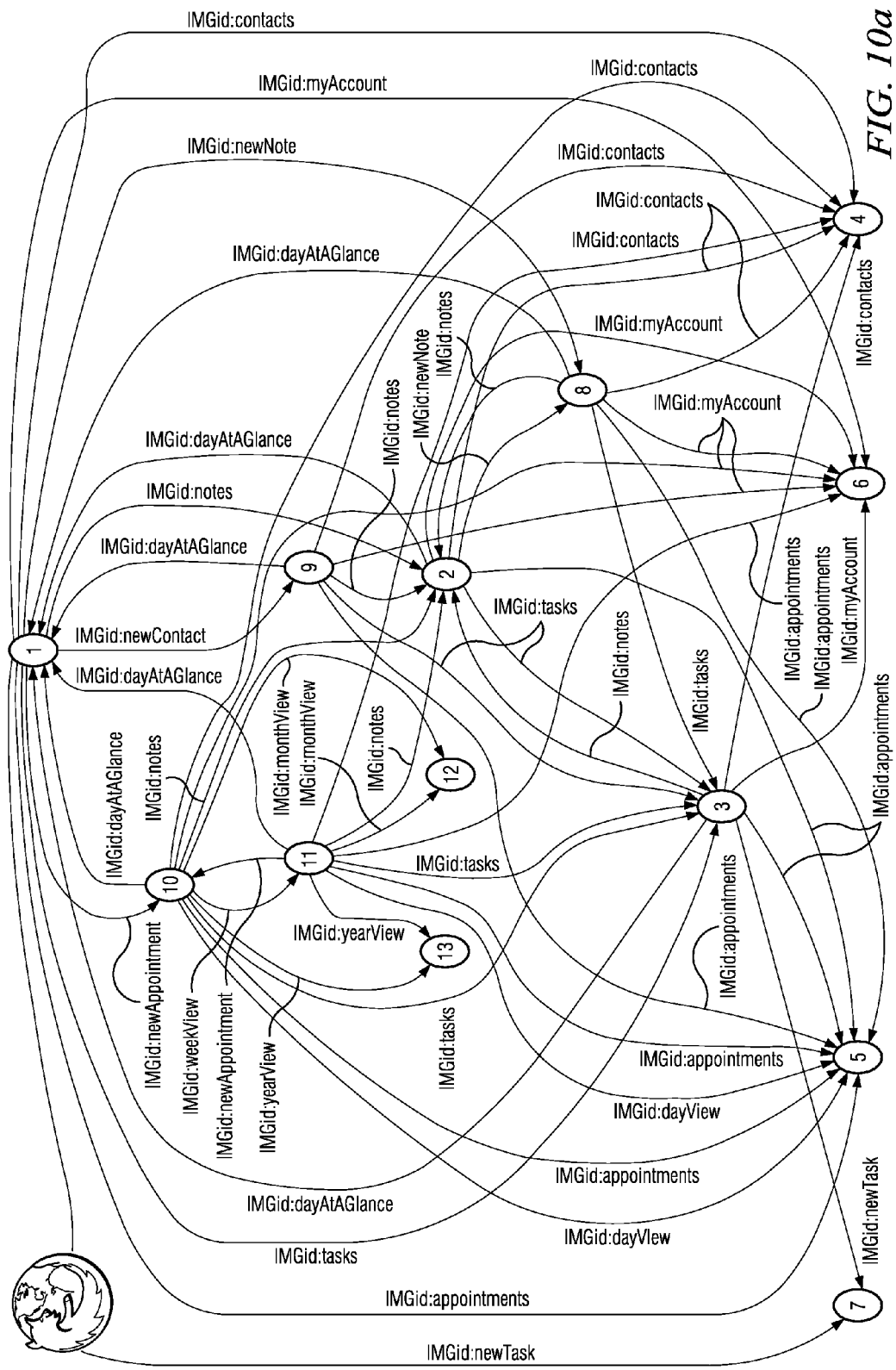
FIG. 10a illustrates an example behavioral model generated by dynamically crawling an event-driven application in a first client-tier environment.
Figure 10B:
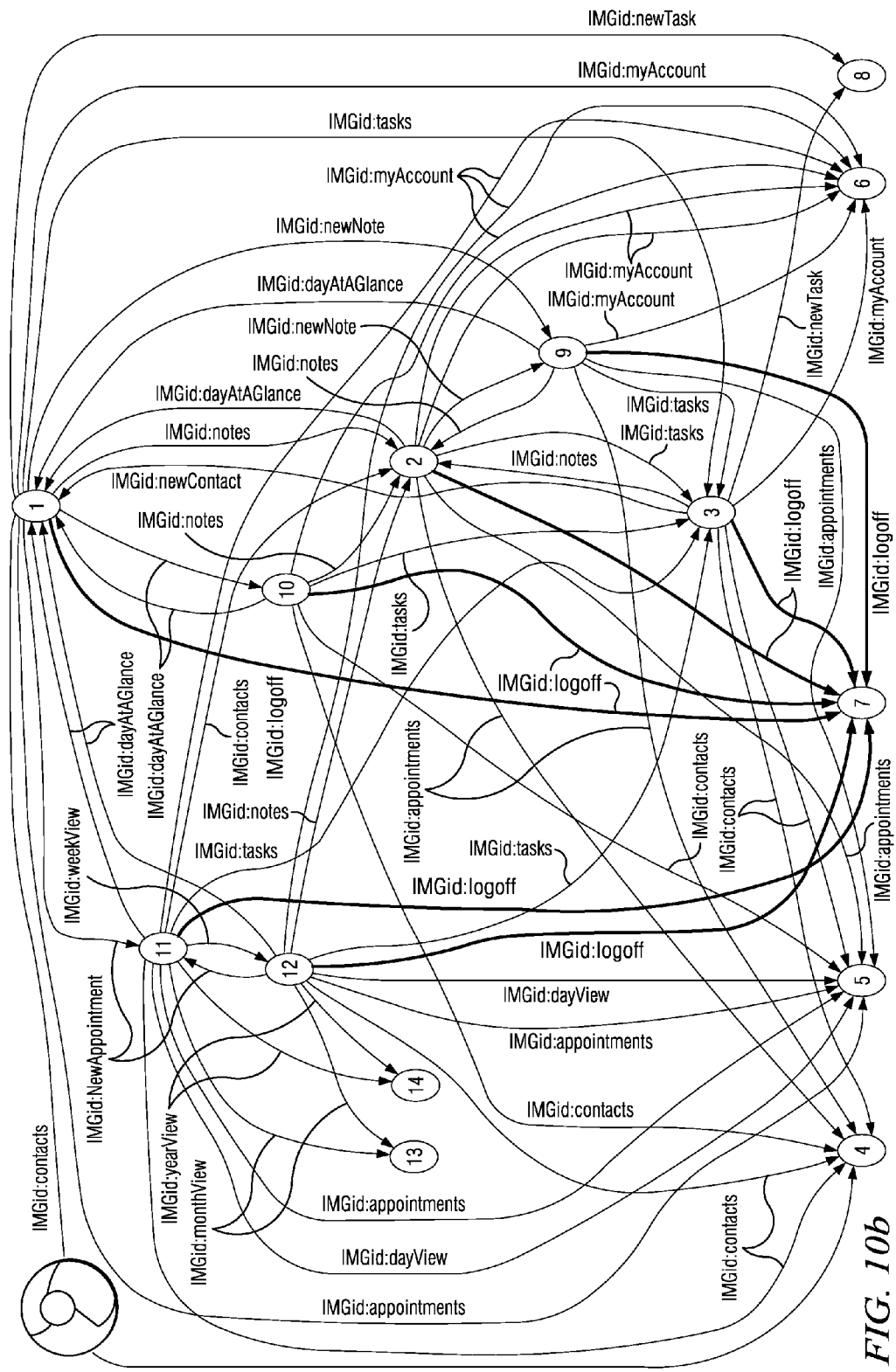
FIG. 10b illustrates an example behavioral model generated by dynamically crawling the same event-driven application in a second client-tier environment.

FIG. 10a illustrates an example behavioral model generated by dynamically crawling an event-driven application in a first client-tier environment that includes a Google® Chrome web browser. FIG. 10b illustrates an example behavioral model generated by dynamically crawling the same event-driven application in a second client-tier environment that includes a Mozilla® Firefox web browser.

FIG. 11 illustrates example screen shots of detected DOM level differences of an event-driven application accessed in different client-tier environments. As an example and not by way of limitation, screenshot 1004 may include detected DOM level differences of an event-driven application accessed in a first client-tier environment that includes a Google® Chrome web browser, and screenshot 1008 may include detected DOM level differences of the same event-driven application accessed in a second client-tier environment that includes Mozilla Firefox.

Figure 12:
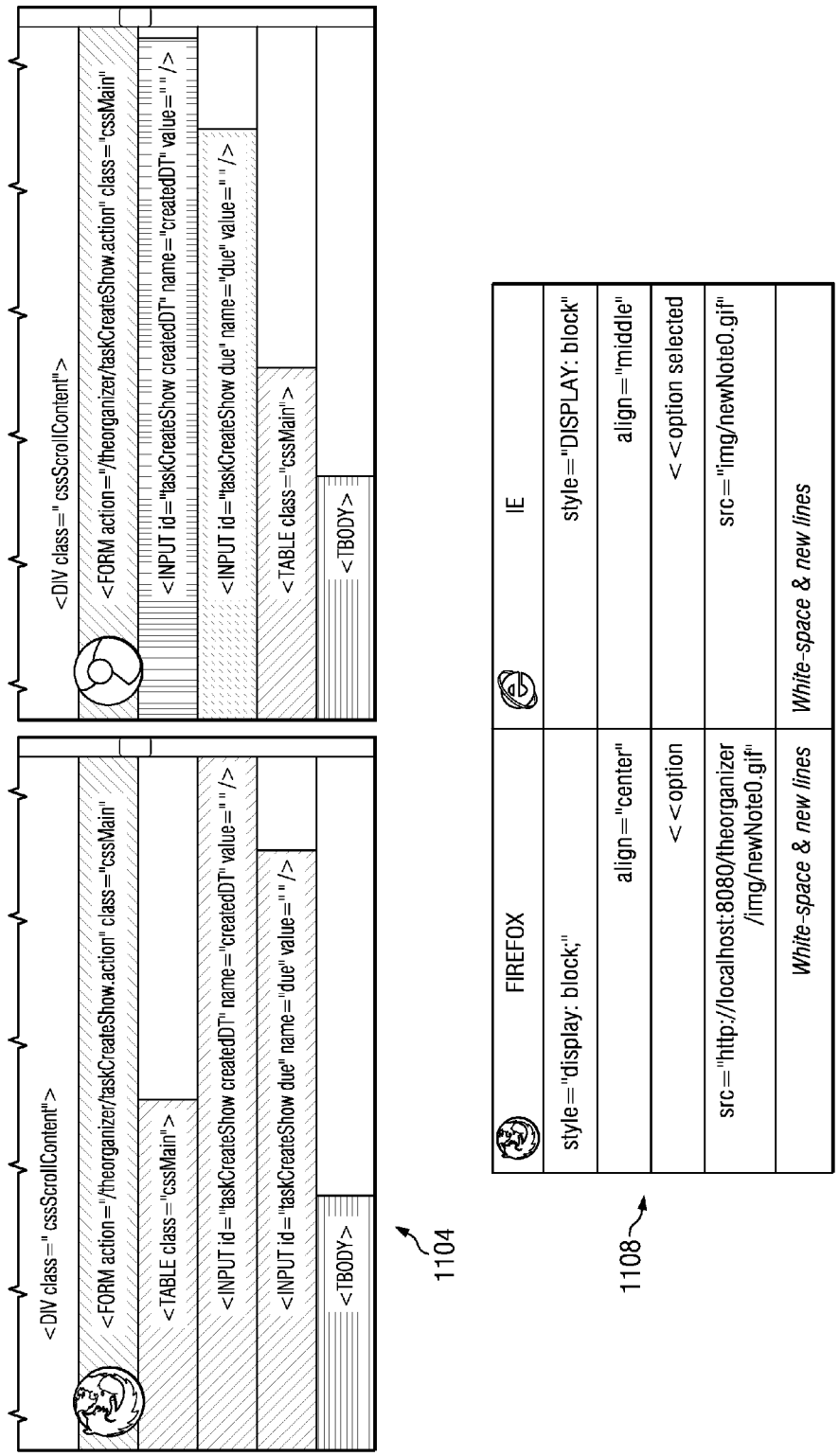
FIG. 12 illustrates example tables of detected differences between two behavioral models.

FIG. 12 illustrates example tables of detected differences between two behavioral models. Table 1104 includes differences between two behavioral models that may be considered relevant. As such, the differences in table 1104 may be outputted to a user. Table 1108 includes differences between two behavioral models that may be considered irrelevant. As such, the differences in table 1108 may not be outputted to a user.

FIG. 13 illustrates an example computer system 1200. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these: Where appropriate, computer system 1200 may include one or more computer systems 1200; be unitary or distributed; span multiple locations; span multiple machines; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. The present disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. The present disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 712 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include an HDD, a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 1200 and one or more other computer systems 1200 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 1200 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, reference to a computer-readable storage medium encompasses one or more tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

This disclosure contemplates one or more computer-readable storage media implementing any suitable storage. In particular embodiments, a computer-readable storage medium implements one or more portions of processor 1202 (such as, for example, one or more internal registers or caches), one or more portions of memory 1204, one or more portions of storage 1206, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in HyperText Markup Language (HTML), Extensible Markup Language (XML), Javascript (JS), Java Server Pages (JSP), Hypertext Preprocessor (PHP), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising, by one or more computer systems:
    upon identification by a user of an event-driven application, automatically and without further user interaction dynamically crawling the event-driven application in a plurality of client-tier environments, wherein dynamically crawling comprises automatically and without user-interaction exercising code to detect and execute one or more doorways of the event-driven application in the plurality of client-tier environments;
    for each of the client-tier environments, generating a behavioral model of the event-driven application comprising rooted directed graphs based on the dynamic crawling;
    for each of the behavioral model, determining one or more pairwise equivalences with respect to one or more other ones of the behavioral models, wherein determining the one or more pairwise equivalences comprises determining isomorphism between the rooted directed graphs; and
    for each of the client-tier environments, determining one or more differences in an end-user experience of the event-driven application in the client-tier environment with respect to one or more other end-user experiences of the event-driven application in one or more other ones of the client-tier environments.

2. The method of claim 1, wherein the event-driven application is a web application.

3. The method of claim 1, wherein each client-tier environment comprises:
    a particular web browser;
    a version of the particular web browser;
    a configuration of the particular web browser;
    a particular operating system (OS) of a computer system that the particular web browser is running on; and
    a screen resolution of a display of the computer system.

4. The method of claim 1, wherein one or more of the differences in the end-user experience of the event-driven application in the client-tier environment are trace-level differences or screen-level differences.

5. The method of claim 1, wherein the behavioral models of the event-driven application comprise state graphs.

6. The method of claim 1, wherein:
    each node in the state graphs represents a state of a screen of the event-driven application; and
    each edge in the state graphs represents a user interaction with the event-driven application causing a transition from one of the states to another.

7. The method of claim 5, wherein the state graphs are finite state machines (FSMs) with partial transition functions.

8. The method of claim 5, wherein determining a pairwise equivalence comprises determining isomorphism between states in state graphs.

9. The method of claim 8, wherein determining the isomorphism between states comprises checking an equivalence between Document Object Model (DOM) trees corresponding to the states.

10. One or more computer-readable non-transitory storage media embodying software that is operable when executed to:
    upon identification by a user of an event-driven application, automatically and without further user interaction dynamically crawl the event-driven application in a plurality of client-tier environments, wherein dynamically crawling comprises automatically and without user-interaction exercising code to detect and execute one or more doorways of the event-driven application in the plurality of client-tier environments;
    for each of the client-tier environments, generate a behavioral model of the event-driven application comprising rooted directed graphs based on the dynamic crawling;
    for each of the behavioral models, determine one or more pairwise equivalences with respect to one or more other ones of the behavioral models, wherein determining the one or more pairwise equivalences comprises determining isomorphism between the rooted directed graphs; and for each of the client-tier environments, determine one or more differences in an end-user experience of the event-driven application in the client-tier environment with respect to one or more other end-user experiences of the event-driven application in one or more other ones of the client-tier environments.

11. The media of claim 10, wherein the event-driven application is a web application.

12. The media of claim 10, wherein each client-tier environment comprises:
a particular web browser;
a version of the particular web browser;
a configuration of the particular web browser;
a particular operating system (OS) of a computer system that the particular web browser is running on; and
a screen resolution of a display of the computer system.

13. The media of claim 10, wherein one or more of the differences in the end-user experience of the event-driven application in the client-tier environment are trace-level differences or screen-level differences.

14. The media of claim 10, wherein the behavioral models of the event-driven application comprise state graphs.

15. The media of claim 10, wherein:
each node in the state graphs represents a state of a screen of the event-driven application; and
each edge in the state graphs represents a user interaction with the event-driven application causing a transition from one of the states to another.

16. The media of claim 14, wherein the state graphs are finite state machines (FSMs) with partial transition functions.

17. The media of claim 14, wherein the software is further operable when executed to determine a pairwise equivalence by determining isomorphism between states in state graphs.

18. The media of claim 17, wherein the software is further operable when executed to determine the isomorphism between states by checking an equivalence between Document Object Model (DOM) trees corresponding to the states.

19. An apparatus comprising:
one or more computer-readable non-transitory storage media embodying one or more instructions; and
one or more processors coupled to the media and operable when executing the instructions to:
upon identification by a user of an event-driven application, automatically and without further user interaction dynamically crawl the event-driven application in a plurality of client-tier environments, wherein dynamically crawling comprises automatically and without user-interaction exercising code to detect and execute one or more doorways of the event-driven application in the plurality of client-tier environments;
for each of the client-tier environments, generate a behavioral model of the event-driven application comprising rooted directed graphs based on the dynamic crawling;
for each of the behavioral models, determine one or more pairwise equivalences with respect to one or more other ones of the behavioral models, wherein determining the one or more pairwise equivalences comprises determining isomorphism between the rooted directed graphs; and
for each of the client-tier environments, determine one or more differences in an end-user experience of the event-driven application in the client-tier environment with respect to one or more other end-user experiences of the event-driven application in one or more other ones of the client-tier environments.

20. The apparatus of claim 19, wherein the event-driven application is a web application.

21. The apparatus of claim 19, wherein each client-tier environment comprises:
a particular web browser;
a version of the particular web browser;
a configuration of the particular web browser;
a particular operating system (OS) of a computer system that the particular web browser is running on; and
a screen resolution of a display of the computer system.

22. The apparatus of claim 19, wherein one or more of the differences in the end-user experience of the event-driven application in the client-tier environment are trace-level differences or screen-level differences.

23. The apparatus of claim 19, wherein the behavioral models of the event-driven application comprise state graphs.

24. The apparatus of claim 19, wherein:
each node in the state graphs represents a state of a screen of the event-driven application; and
each edge in the state graphs represents a user interaction with the event-driven application causing a transition from one of the states to another.

25. The apparatus of claim 23, wherein the state graphs are finite state machines (FSMs) with partial transition functions.

26. The apparatus of claim 23, wherein the processor is further operable to determine a pairwise equivalence by determining isomorphism between states in state graphs.

27. The apparatus of claim 26, wherein the processor is further operable to determine the isomorphism between states by checking an equivalence between Document Object Model (DOM) trees corresponding to the states.

28. A method comprising, by one or more computer systems:
upon identification by a user of an event-driven application, automatically and without further user interaction dynamically crawling the event-driven application in a plurality of client-tier environments, wherein dynamically crawling comprises automatically and without user-interaction exercising code to detect and execute one or more doorways of the event-driven application in the plurality of client-tier environments;
for each of the client-tier environments, generating a behavioral model of the event-driven application based on the dynamic crawling;
for each of the behavioral models, determining one or more pairwise equivalences with respect to one or more other ones of the behavioral models; and
for each of the client-tier environments, determining one or more differences in an end-user experience of the event-driven application in the client-tier environment with respect to one or more other end-user experiences of the event-driven application in one or more other ones of the client-tier environments, and
wherein the behavioral model for each of the client-tier environments comprises rooted directed graphs, and wherein the processor is further operable to determine a pairwise equivalence by determining isomorphism between at least two rooted directed graphs.

29. The method of claim 1, wherein:
based on the isomorphism determined between the pair of rooted directed state graphs, determining one or more differences indicating that an event did not occur in one of the client-tier environments.

* * * * *